United States Patent Office 3,128,503
Patented Apr. 14, 1964

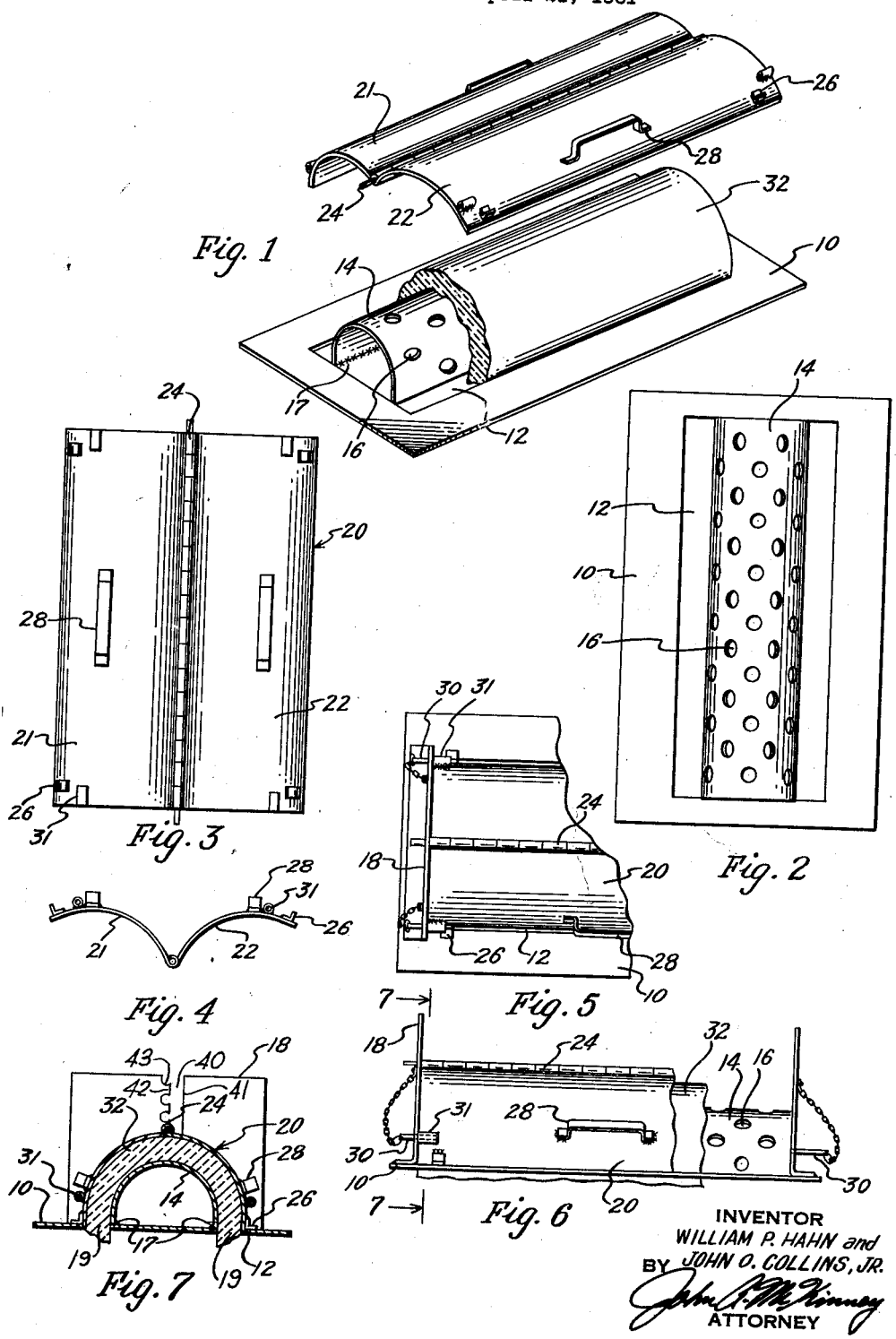

3,128,503
APPARATUS FOR MOLDING PIPE INSULATION
William P. Hahn, Toledo, Ohio, and John O. Collins, Jr., Martinsville, N.J., assignors to Johns-Manville Corporation, New York, N.Y., a corporation of New York
Filed Apr. 21, 1961, Ser. No. 104,571
2 Claims. (Cl. 18—34)

This invention relates to apparatus for molding pipe insulation, being particularly applicable to the molding of flat, pliable, fibrous felts or sheets of raw or unbaked mineral wool or other forms of fibrous material such as fiber glass and the like into semi-cylindrical pipe insulation sections.

One of the methods of forming pipe insulation is to form the pipe insulation from large felts or sheets of the material lying in one flat layer and having upper and lower surfaces, usually being fairly well defined skin layers, have the same length and breadth. When bent into semi-cylindrical form the inner surface tends to wrinkle or fold and/or the outer surface is stretched unless steps are taken to avoid these difficulties. Also in forming such felts into semi-cylindrical pipe sections the uncured felt is usually either placed over the male die and the female die, properly shaped and sized to correspond to the exterior surface of the finished product, is passed over the felt and male die, or vice versa, in either event it being practically impossible to compress the raw felt between the male and female dies without injury to one surface of the felt.

It is a primary object of the invention to compress and hold in position for setting or curing a felt of insulation material, compressed in a manner to permit the inner and outer surfaces to assume their semi-cylindrical form without becoming torn, wrinkled or stretched out of shape.

The foregoing object is accomplished in accordance with the present invention by placing the uncured felt loosely over the male die and the female die is brought into position adjacent the male die and felt. The female die is then wrapped around the exterior surface of the felt, which is compressed by the application of radial force against the exterior surfaces of the felt. This causes the felt to assume the desired semi-cylindrical shape but the edges of the inner surface and adjacent insulating material are forced downwardly beyond the dies, while causing both surface layers to lie smoothly against the curved outer and inner surfaces of the respective dies. Perfect semi-cylindrical pipe sections are thus formed from relatively thick, flat or plane felts or sheets of the raw material. The binder of the felt is then set and the edges trimmed after which the product is ready for use or for further processing.

The above and other objects will be clear from the following description when considered in connection with the drawings, wherein:

FIG. 1 is a perspective view of the basic elements of the apparatus, separated to receive the raw felt, positioned to be formed into pipe insulation;

FIG. 2 is a plan view of the base plate and male die;

FIG. 3 is a plan view of the female die with the wings thereof in elevated or open, inoperative position;

FIG. 4 is an end view thereof;

FIG. 5 is a fragmentary plane view of the apparatus in final molding position;

FIG. 6 is an elevational view thereof, parts being broken away; and

FIG. 7 is a transverse sectional view on the line 7—7 of FIG. 6.

Referring now to the details of the drawings, the equipment includes a suitable supporting frame shown as a base plate 10, with longitudinal slots 12 extending for the major portion of the length of the base plate and having the same length as the insulation felt. The male die 14 extends across or bridges the space between the inner edges of the slots, the lower edges of the die coinciding with the inner edges of the slots. The surface thereof is generally semi-cylindrical in form as shown and is preferably perforated to provide a foraminous body for the purposes stated below. At the lower side edges of the male die, the curvature of the male die on a constant radius is terminated adjacent the regions designated 17 in FIG. 7, and the lower side edges of the male die extend linearly downwardly thereat to form the projecting ends 19 lying in parallel planes spaced from each other a distance equal to the maximum diameter of the male die. This provides for the formation of short parallel "legs" extending beyond the 180° arc of a true semi-cylinder, in the molded insulation, which legs may then be trimmed off in forming the finished insulation. The male die may be welded throughout its length to the base plate, as shown, adjacent the regions 17, or it may be welded at its ends in which case the central section of the plate, between the slots, may be omitted. End plates 18 (FIG. 6) may be secured to the plate, one adjacent each end of the male die and slots, for confining the insulation material between the dies.

The female die 20 is formed of two sections 21 and 22 hinged together as shown at 24. These sections are in effect wings, hinged at or near the top central portion of the female die so that they can be swung from the open position shown in FIGS. 1 and 4 to the operative or compressing position shown in FIGS. 5 to 7. The wing sections are provided with suitable stops 26 to prevent them from being forced downwardly beyond their final operative position. The handles 28 serve for lifting and swinging the wings during their manipulation. The wings may be locked in the position shown in FIGS. 5 to 7 by suitable latches 30 shown as pins engaging in eyelets 31 secured to the ends of the sections adjacent their free edges. This type of female die member allows for a compressing action on the felt and very little, if any, tearing action.

Each end plate 18 is further provided with a slot 40 having one vertically extending substantially linear side wall 41. The other wall is defined by a plurality of lugs 42 having curved inset portions 43. The hinge pin 44 passing through the hinges 24 is made of sufficient length so as to extend axially beyond each of the ends of the hinges 24. Each end of the hinge pin 44 is positioned in the inset portion 43 of the lugs 42 depending upon the desired thickness of the pipe insulation.

It will be understood that the illustration of a simple plate 10 for the frame and handles 28 for the manipulation of the wings of the female die are merely symbolic and that these represent means for supporting the mechanism, means for operating the female die and wings, etc. It is contemplated suitable mechanisms will be provided for supporting and operating the various elements of the apparatus herein disclosed.

The method of operation will be clear from the above description. A felt of raw insulating material 32 is placed centrally on the male die, extending from end to end thereof as in FIG. 1. The female die is then lowered into the slot 40 and seated in the proper inset portion 43 so that the female die is spaced from the male die a distance approximately equal to the final thickness of the pipe insulation. It is obvious that the distance around the surface of the female member of the mold is greater than the distance around the surface of the male member. Since the felts are essentially the same width both top and bottom, some provision must be made to prevent either the outer surface of the felt from becoming stretched, or the inner surface from becoming compressed and wrinkled. This is accomplished by cutting the unbaked felt to conform to the surface of the female member and allowing the excess felt on the surface of the male member to be extruded through the slots on either side thereof. The wings are then swung inwardly about their hinges, pressing against successive portions of the exterior surface of the felt. The felt is thus forced evenly against the male die, with the ends thereof being forced or extruded into the slots 12, the line of greatest extrusion being at the inner surface contacting the male die. The perforations 16 in the male die permit the escape of air from the matt, thus facilitating the application of the inner surface smoothly against the male die.

It is important that the unbaked felt be of a rather low 2–4 p.c.f. density at the start of the molding process, in order that the fibrous layers within the felt be allowed to slip past one another as the mold is closed and the felt is compressed into proper shape and desired product density. A compressed or higher density unbaked felt would disrupt the extrusion process and result in wrinkles on the inner surface of the finished product.

For most insulation materials of this type the binder is set by heat. This can be accomplished by transporting a number of locked molds to an oven, maintained at the desired temperature, or by passing heated air through the core of the mold, formed by the male die. For binders set by cooling or by lapse of time the molds can be supplied with cooling air or stored. In any event the perforations in the male die facilitate the application of heat or cold to the interior of the product and permit the escape of volatile ingredients, all such treatments being referred to herein as setting the binder or insulation.

While the invention has been described in rather full detail, it will be understood that these details need not be strictly adhered to and that various changes and modifications may suggest themselves to one skilled in the art, all falling within the scope of the invention as defined by the subjoined claims.

What we claim is:
1. Apparatus for forming a felt of pliable, fibrous insulation into a semi-cylindrical section comprising a base plate having formed therein a pair of longitudinally extending transversely-spaced slots, a male die having a substantially, foraminous bearing surface mounted on said base plate between the inner edges of said slots, a female die member having at least two relatively movable side wings of generally arcuate form on their interior compression surface, means for supporting said wings adjacent to but spaced from the longitudinal central portion of said male die and with the free edges of said wings movable toward or away from said male die and the outer edges of said slots, and means for moving said side wings toward said male die to a position wherein the interior surface of said female die is concentric to the exterior surface of said male die and to compress a felt of pliable fibrous insulation between said male and female dies and to force any excess portion of said fibrous insulation through said slots.

2. Apparatus as defined in claim 1 and further comprising end plates positioned adjacent the ends of said male die for confining said insulation to the space within and beneath said wings of said female die.

References Cited in the file of this patent
UNITED STATES PATENTS

| | | |
|---|---|---|
| 305,303 | Grant | Sept. 16, 1884 |
| 684,648 | Martin | Oct. 15, 1901 |
| 780,843 | Wallace | Jan. 24, 1905 |
| 1,126,853 | Peterson | Feb. 2, 1915 |
| 1,941,299 | Greenidge | Dec. 26, 1933 |
| 2,386,535 | Beinhoff | Oct. 9, 1945 |
| 2,401,299 | Glavin | June 4, 1946 |
| 3,039,140 | Andrews | June 19, 1962 |